United States Patent Office 2,975,064
Patented Mar. 14, 1961

2,975,064
PRODUCT AND METHOD FOR IMPROVING FROZEN DESSERTS

Gerald D. Sperry, San Diego, Calif., assignor to Kelco Company, San Diego, Calif., a corporation of Delaware No Drawing. Filed Nov. 13, 1959, Ser. No. 852,599

14 Claims. (Cl. 99—136)

This invention relates to a new and useful method and composition for improving the manufacture of ice cream and other frozen desserts such as ice milk. More particularly, the invention relates to certain additives useful as stabilizers in ice cream and other fat containing frozen dessert mixes at low concentrations to produce an ice cream or frozen dessert having good generally desirable qualities and, in addition, to have a so-called good "chew."

This application is a continuation-in-part of my copending application Serial No. 643,246, filed March 1, 1957, entitled "Product and Method for Improving Frozen Desserts," now abandoned.

The present trend in ice cream and other frozen desserts is for a finished product with a heavier body than was common several years ago. This type of body offers a certain amount of bite resistance or is more commonly referred to in the industry as "chewy." The degree of chew varies from one market to another, but the general acceptance of a heavier bodied product appears to be nationwide. In accordance with this invention I have found that a new algin development, carboxymethyl alginate, is not only a good stabilizer for frozen dessert mixes but moreover is surprisingly effective in producing a frozen dessert having so-called good "chew" characteristics.

An ice cream mix consists essentially of a mixture of dry milk solids, cream or butter, and sugar. These proportions vary with trade requirements and State regulations, but an average ice cream will have about 12% or more butter fat, 10% dry milk solids, and 16% sugar by weight. An ice milk is of similar composition except that it usually has a lesser butter fat content such as 2% to 10%. Still other frozen desserts such as Mellorine, an imitation ice cream, are made with vegetable fats.

In the usual production of frozen desserts such as ice cream, small portions of a stabilizer such as sodium alginate or gelatin are added to the ice cream mix as a stabilizer to produce an ice cream having a smooth body and to prevent the growth of ice crystals in storage. Such additives are employed both alone and in various combinations. The alginates that are usually used as ice cream stabilizers tend to produce an ice cream which has very good body, texture, and heat shock resistance but at the same time does not incorporate the particular bite resistance or chew which may be desired. Materials that have heretofore been used to give the ice cream a chewy texture, both alone and in combination with alginates, include locust bean gum and guar gum. However, such gums do not give all that is desired in the way of stability to the ice cream or frozen dessert mix when it is held in storage. Thus, for example, there is often serum separation which, in turn, makes a non-uniform mix. Still other materials that have produced a good chew type ice cream do not yield a melt down of the hardened ice cream that is desirable.

It is an object of this invention to provide a new method of stabilizing a frozen dessert. It is still another object of this invention to produce an ice cream or frozen dessert having good so-called "chew" characteristics.

It is a further object of this invention to produce an ice cream or frozen dessert of the type known as a heavier bodied product.

It is a further object of this invention to produce an ice cream mix for a chewy type ice cream that is relatively stable and will not have serum separation even though the mix is held overnight or stored before being frozen.

It is still another object of this invention to produce an ice cream or frozen dessert having a good melt-down.

It is a further object of this invention to produce a stabilizer having relatively good solubility in frozen dessert mixes.

In accordance with this invention, I have found that one or more of the foregoing objectives may be accomplished by the addition of a small amount of a water soluble carboxymethyl alginate to an ice cream or frozen dessert mix.

The alginates that have been heretofore used as ice cream stabilizers are usually alginate compositions or certain alginates that are soluble in an ice cream mix. The compositions that are soluble in an ice cream mix are those containing about 50% by weight of sodium alginate with sugar added to improve the solubility in water, and with a small proportion of sodium phosphate added to render the composition compatible with the calcium ions of milk. Such a composition is described in United States Patents Nos. 2,097,228; 2,097,299; 2,097,231 and 2,485,934. Alginates that are soluble in an ice cream mix are described in United States Patent No. 2,485,935 for example, propylene glycol alginates.

The carboxymethyl alginate suitable for use in accordance with my invention is such an alginate having a viscosity of 10,000 centipoises or more when the said alginate is dissolved in a 5% concentration in water.

The carboxymethyl alginates that I employ in accordance with my invention, as aforementioned, are a very recent algin development.

Such alginates are preferably prepared from either sodium alginate or calcium alginate by reacting such an alginate with a concentrated sodium hydroxide solution to form the alcoholate. The alcoholate so formed is then reacted with a chloroacetic compound such as sodium chloroacetate to form a carboxymethyl alginate. The following examples set forth procedures for producing carboxymethyl alginates suitable for use in accordance with my invention.

Example 1.—600 gms. of dry calcium alginate were mixed with 480 gms. of a 50% sodium hydroxide solution in a Hobart mixer. The internal temperature was maintained at 20° C. The mixing was continued for 15 minutes and then 1755 gms. of 40% sodium chloroacetate were added to the mixture. The temperature was still maintained at 20° C. The resulting mixture was allowed to set for 24 hours. It was then dumped into 4 liters of 75–25 methanol-water mix. The mix was then stirred in a large Waring Blendor for several minutes. It was then filtered and the precipitate retreated two more times by the same procedure with the methanol-water mix. A similar treatment with three 100% methanol treatments followed. The mixture was then air-dried and milled through 40 mesh. The resulting product was identified as sodium, calcium carboxymethyl alginate.

Example 2.—A 600 gm. sample of a commercial sodium alginate sold under the name Kelcosol was substituted for the calcium alginate in the preceding example and a small amount (100 to 150 ml.) of isopropyl alcohol was added in order to prevent too heavy a paste from being formed. The procedure of Example 1 was then repeated with the aforesaid exceptions, and a sodium carboxymethyl alginate was formed.

The reaction of the algin with the sodium chloroacetate may be expressed as follows:

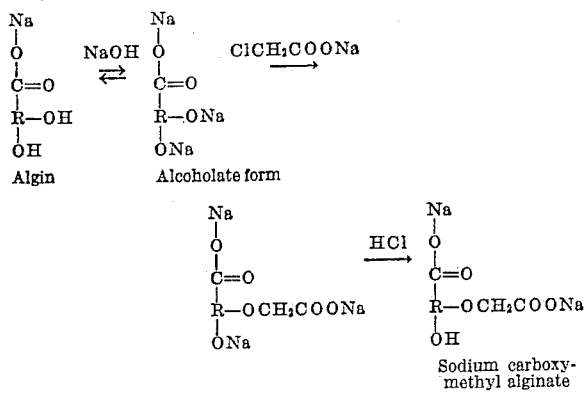

where R represents all portions of each algin polymer link to which are attached the $C_2$ and $C_3$ hydroxyls and the uronic carboxyls.

The chloroacetic compound, calculated as sodium chloroacetate, is used in an amount that is varied depending upon the degree of substitution desired, as well as the temperature and time of reaction. In general, about .4 to 1.5 parts by weight as sodium chloroacetate per part of algin calculated as sodium alginate, dry basis, will be found suitable.

The reaction time for the aforementioned materials will vary depending on the temperature at which the reaction is carried out. A temperature and reaction time is selected to obtain optimum reaction of the ingredients with a minimum degradation effect on the algin. Ordinarily, this is in the range of 0° C. to 60° C. and from 1 hour to 1 week. It has been noted that in the 50° to 60° C. range, good results may be obtained in from 2 to 4 hours.

In accordance with my invention I have found that the carboxymethyl alginates which may be prepared as above are particularly suitable as stabilizers, either alone or in combination with other stabilizers and additives for fat containing frozen dessert mixes. The carboxymethyl alginate should be present in small amounts sufficient to give relative stability to the frozen dessert mix with which it is incorporated. The amounts required vary depending upon the particular mix. Thus, amounts in the range from about 0.05% to 0.5% by weight of the frozen dessert mix are suitable for use in accordance with my invention depending on the particular mix employed and amounts in the range of 0.2% to 0.3% by weight of the said frozen dessert mix have been found to be particularly effective. The following are examples of my invention:

*Example 1.*—A typical commercial ice cream mix was prepared comprising 10% butter fat, 12% serum solids, 12% cane sugar and 5% corn syrup. Two ice creams were prepared from this mix using (a) 0.3% of a sodium alginate stabilizer and (b) 0.18% of an alginate derivative stabilizer. The ice creams from both of these formulas were prepared by the batch method for both pasteurization and freezing. The ice creams so prepared were then compared with another ice cream made from the same formula except that 0.2% of a high viscosity sodium calcium carboxymethyl alginate was substituted as the stabilizer. The ice cream prepared with the high viscosity sodium calcium carboxymethyl alginate was surprisingly superior in body and bite resistance over the aforesaid ice creams (a) and (b) prepared with conventional alginate stabilizers.

*Example 2.*—An ice milk mix was prepared having a butter fat content of 4%. The procedure for Example 1 was then repeated except the ice milk mix was used rather than an ice cream mix. The ice milk, stabilized with the high viscosity sodium calcium carboxymethyl alginate, had surprisingly superior chew characteristics to the ice milk prepared with the conventional alginate additives. The melt down of the ice milk was smooth, homogeneous and free of any serum drainage.

The sodium calcium carboxymethyl alginate used on both Examples 1 and 2 was a so-called high viscosity carboxymethyl alginate having a viscosity in excess of 10,000 centipoises in a 5% concentration. Other similar frozen dessert mixes were prepared with sodium carboxymethyl alginate. However, I prefer the sodium calcium carboxymethyl alginate for my purpose, and preferably a high viscosity sodium calcium carboxymethyl alginate because of improved and more complete solubility characteristics.

I claim:

1. The method of producing a fat containing frozen dessert which comprises adding to the mix for said dessert a small amount of a carboxymethyl alginate having a viscosity of not less than 10,000 centipoises when the said alginate is dissolved in a 5% concentration in water the said amount being sufficient to stabilize the said dessert.

2. A method of improving a fat containing frozen dessert mix which comprises adding to said dessert mix a high viscosity sodium, calcium carboxymethyl alginate in a small amount sufficient to stabilize the ingredients present in said frozen dessert mix.

3. An ice cream comprising as an ingredient a small amount of a sodium carboxymethyl alginate having a viscosity of not less than 10,000 centipoises when the said alginate is dissolved in a 5% concentration in water the said amount being sufficient to stabilize the said dessert.

4. An ice milk comprising as an ingredient a small amount of a sodium carboxymethyl alginate having a viscosity of not less than 10,000 centipoises when the said alginate is dissolved in a 5% conceneration of water the said amount being sufficient to stabilize the said dessert.

5. A frozen vegetable fat imitation ice cream dessert comprising as an ingredient a small amount of a sodium carboxymethyl alginate having a viscosity of not less than 10,000 centipoises when the said alginate is dissolved in a 5% concentration in water the said amount being sufficient to stabilize the said dessert.

6. A composition selected from the group consisting of ice cream, frozen vegetable fat dessert, and ice milk, said composition comprising as an ingredient from about 0.2% to 0.3% by weight of the mix for said composition of a carboxymethyl alginate having a viscosity of not less than 10,000 centipoises when the said alginate is dissolved in a 5% concentration in water.

7. As an article of manufacture a new food product composed of ice cream containing a small percentage of a high viscosity sodium, calcium carboxymethyl alginate the said small percentage being an amount sufficient to stabilize the ingredients present in said food product.

8. A method of producing a fat containing frozen dessert which comprises adding to the mix for said dessert from about 0.05% to 0.5% based on the weight of the mix of a carboxymethyl alginate having a viscosity of not less than 10,000 centipoises when the said alginate is dissolved in a 5% concentration in water.

9. A method of improving a fat containing frozen dessert mix which comprises adding to said dessert mix from about 0.05% to 0.5% based on the weight of the mix of a high viscosity soduim, calcium carboxymethyl alginate to stabilize the ingredients present in said frozen dessert mix.

10. An ice cream comprising as an ingredient from about 0.05% to 0.5% based on the weight of the mix of a sodium carboxymethyl alginate having a viscosity of not less than 10,000 centipoises when the said alginate is dissolved in a 5% concentration in water.

11. An ice milk comprising as an ingredient about from 0.05% to 0.5% based on the weight of the mix of a sodium carboxymethyl alginate having a viscosity of not less than 10,000 centipoises when the alginate is dissolved in a 5% concentration in water.

12. A frozen vegetable fat dessert comprising as an ingredient about 0.05% to 0.5% based on the weight of the dessert of a sodium carboxymethyl alginate having a viscosity of not less than 10,000 centipoises when the said alginate is dissolved in a 5% concentration in water.

13. A composition selected from the group consisting of ice cream, ice milk and a frozen vegetable fat dessert, said composition comprising as an ingredient from about 0.05% to 0.5% by weight of the mix for said composition of a carboxymethyl alginate having a viscosity of not less than 10,000 centipoises when the said alginate is dissolved in a 5% concentration in water.

14. As an article of manufacture, a new food product composed of ice cream containing about 0.05% to 0.5% based on the weight of the mix of a high viscosity, sodium, calcium carboxymethyl alginate.

References Cited in the file of this patent

UNITED STATES PATENTS

| | | |
|---|---|---|
| 2,400,834 | Le Gloahec | May 21, 1946 |
| 2,548,865 | Burt | Apr. 17, 1951 |
| 2,653,106 | Bouniksen | Sept. 22, 1953 |